United States Patent
Omori et al.

(10) Patent No.: US 7,409,695 B2
(45) Date of Patent: Aug. 5, 2008

(54) DISC DRIVE APPARATUS

(75) Inventors: Kiyoshi Omori, Tokyo (JP); Yuji Suzuki, Kanagawa (JP); Takashi Ootsuka, Kanagawa (JP); Satoshi Muto, Chiba (JP); Manabu Yoshii, Kanagawa (JP); Koji Natsubori, Chiba (JP); Hiroyuki Fukuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 400 days.

(21) Appl. No.: 11/061,621

(22) Filed: Feb. 22, 2005

(65) Prior Publication Data

US 2005/0193404 A1   Sep. 1, 2005

(30) Foreign Application Priority Data

Feb. 25, 2004   (JP)   ............................. 2004-050359

(51) Int. Cl.
G11B 33/08   (2006.01)

(52) U.S. Cl. ...................................................... 720/648

(58) Field of Classification Search .................. None
See application file for complete search history.

(56) References Cited

U.S. PATENT DOCUMENTS

| 4,772,974 | A | * | 9/1988 | Moon et al. | 360/78.04 |
| 5,030,260 | A | * | 7/1991 | Beck et al. | 96/139 |
| 5,877,915 | A | * | 3/1999 | Ishida | 360/97.03 |
| 7,082,012 | B2 | * | 7/2006 | Macpherson et al. | 360/97.02 |
| 7,166,142 | B2 | * | 1/2007 | Tuma et al. | 55/385.6 |

* cited by examiner

*Primary Examiner*—Joseph Feild
*Assistant Examiner*—Mark Blouin
(74) *Attorney, Agent, or Firm*—Oblon, Spivak, McClelland, Maier & Neustadt, P.C.

(57) ABSTRACT

A disc drive apparatus comprises a housing; a disc-holding unit that holds an optical disc in the housing; a disc-driving mechanism that rotates the optical disc held by the disc-holding unit; an optical pickup that writes signals in, and reads signals from, the optical disc being rotated by the disc-driving mechanism; and a pickup-moving mechanism that moves the optical pickup in a radial direction of the optical disc. The housing has an air-inlet port which is located above the optical disc held by the disc-holding unit and through which air is drawn from outside by virtue of an airflow that develops as the optical disc is rotated, and air-outlet ports through which air is discharged from the housing.

18 Claims, 10 Drawing Sheets

DISC DRIVE APPARATUS

BACKGROUND OF THE INVENTION

1. Field of the Invention

The present invention relates to a disc drive apparatus that records data signals in, and/or reproduces data signals from, an optical disc or a magneto-optical disc.

This application claims priority of Japanese Patent Application No. 2004-050359, filed on Feb. 25, 2004, the entirety of which is incorporated by reference herein.

2. Description of the Related Art

Optical discs, such as CDs (Compact Discs), DVDs (Digital Versatile Discs) and magneto-optical discs, are widely known. Various types of disc drive apparatuses have been developed, which are designed to drive these optical discs.

FIG. 1 shows a disc drive apparatus 201 that records data signals in, and reproduces data signals from, an optical disc 200. The apparatus 201 comprises a housing 202, a disc tray 203, and a base unit 204. The housing 202 has a tray port 202a made in the front. Through the tray port 202, the disc tray 203 can be inserted into and pulled from the housing 202 in the horizontal direction. The base unit 204 is secured to the disc tray 203.

The housing 202 comprises a lower case 205 and a top plate 206. The lower case 205 is shaped like a flat box and opens at the top. The top plate 206 closes the opening of the lower case 205. The front wall of the housing 202 has an opening, i.e., tray port 202a.

The disc tray 203 can slide between a pulled-in position and a pulled-out position. At the pulled-in position, the disc tray 203 lies in the housing 202 after it is pulled in through the tray port 202a. At the pulled-out position, the disc tray 203 protrudes from the housing 202 after it is pulled out through the tray port 202a. The disc tray 203 has a recess 207 made in the upper surface. An opening 208 is cut in the bottom of the recess 207. Through this opening 208, the upper surface of the base unit 204, which is secured to the lower surface of the disc tray 203, is exposed upwards. A front panel 209 is secured to the front edge of the disc tray 203. The front panel 209 can open and close the tray port 202a of the housing 202.

As FIG. 2 shows, the base unit 204 comprises a disc-driving mechanism 210, an optical pickup 211, a pickup-moving mechanism 212, and a base 213. The disc-driving mechanism 210 rotates the optical disc 200. The optical pickup 211 writes signals in, and reads signals from, the optical disc 200. The pickup-moving mechanism 212 moves the optical pickup 211 in the radial direction of the optical disc 200. The mechanism 210, optical pickup 211 and mechanism 212 are attached to the base 213.

The disc-driving mechanism 210 has a turntable 214 and a spindle motor 215. The turntable 214 holds the optical disc 200. The spindle motor 215 is shaped like a flat disc and rotates the turntable 214. When the turntable 214 is rotated, the optical disc 200 is rotated, too.

The optical pickup 211 has a semiconductor laser, an objective lens 211a, and a photodetector. The laser emits a light beam. The lens 211a focuses the light beam, applying the beam to the signal-recorded surface of the optical disc 200, thus writing signals in the optical disc 200. The photodetector detects the light beam reflected from the signal-recorded surface of the optical disc 200, thus reading signals from the optical disc 200.

The pickup-moving mechanism 212 has two guide rods 215a and 215b, a lack member 216, a lead screw 217, and a stepping motor 218. The guide rods 215a and 215b support the optical pickup 211, enabling the pickup 211 to move in the radial direction of the optical disc 200. The lack member 216 is secured to the optical pickup 211. The lead screw 217 is in mesh with the lack member 216. The stepping motor 218 rotates the lead screw 217. When the stepping motor 218 rotates the lead screw 217, the lack member 216 is moved in the radial direction of the optical disc 200 because it remains in mesh with the lead screw 217. As a result, the optical pickup 211 moves in the radial direction of the optical disc 200.

The base 213 has openings 219a and 219b that are continuous to each other. The opening 219a exposes the turntable 214. The opening 219b exposes the optical pickup 211. To the surface of the base 213, which is opposite to the surface at which the turntable 214 and optical pickup 211 are exposed, there are secured the spindle motor 215, the ends of guide rods 215a and 215b, the lead screw 217, the stepping motor 218, and the like.

In the disc drive apparatus 201 described above, the spindle motor 215 rotates the optical disc 200 held on the turntable 214, while the disc tray 203 remains in the housing 202. The pickup-moving mechanism 212 moves the optical pickup 211 in the radial direction of the optical disc 200. As the optical pickup 211 is so moved, it writes signals in, or reads signals from, the optical disc 200.

In the disc drive apparatus 201 described above, an airflow develops when the optical disc 200 rotates in the housing 202. The airflow that develops as the optical disc 200 rotates performs a pumping action, drawing air from outside into the housing 202. Thus, air flows from outside into the housing 202 of the disc drive apparatus 201. Here arises a problem. The dust or the like, contained in the air coming from outside, fouls the optical pickup 211 and the like.

More specifically, dust or the like may stick to the objective lens 211a of the optical pickup 211 in the disc drive apparatus 201. In this case, the apparatus 201 can no longer reliably record signals in, or reproduce signals form the optical disc 200.

To prevent air containing dust or the like from entering the housing 202 from outside, the housing 202 may be sealed airtight. If the housing 202 is so sealed, however, the negative pressure rises in the housing 202. This may cause the top plate to sag. If the top plate sags, it may abut on the optical disc 200.

In the disc drive apparatus 201, the rotational speed of the optical disc 200 is increased to write signals faster in the optical disc 200. In the apparatus 201, however, the higher the rotational speed of the disc 200, the stronger the airflow that develops as the optical disc 200 rotates. Hence, the force that draws air from outside into the housing 202 inevitably increases.

In this case, air enters the housing 202 from outside through narrow gaps in the housing walls, due to diffusion and local pressure drop. Consequently, the dust or the like, which is contained in the air, accumulate in the housing 202. This presents the problem that the cleanliness level in the housing 202 falls within a short time.

Jpn. Pat. Appln. Laid-Open Publication No. 11-296866, for example, is a prior-art reference that is relevant to the present invention.

Jpn. Pat. Appln. Laid-Open Publication No. 11-296866 discloses a disc drive apparatus. In this apparatus, a cover covers both surfaces of the base that holds the optical pickup. However, it is difficult for the cover to prevent the optical pickup from being fouled with the dust or the like that is contained in the air flowing from outside.

SUMMARY OF THE INVENTION

The present invention has been made in view of the foregoing. An object of this invention is to provide a disc drive apparatus in which the cleanliness in the housing can be maintained, without the necessity of sealing the housing airtight.

To achieve this object, a disc drive apparatus according to this invention comprises: a housing; a disc-holding unit that holds an optical disc in the housing; a disc-driving mechanism that rotates the optical disc held by the disc-holding unit; an optical pickup that writes signals in, and reads signals from, the optical disc being rotated by the disc-driving mechanism; and a pickup-moving mechanism that moves the optical pickup in a radial direction of the optical disc. The housing has an air-inlet port which is located above the optical disc held by the disc-holding unit and through which air is drawn from outside by virtue of an airflow that develops as the optical disc is rotated, and air-outlet ports through which air is discharged from the housing.

In the disc drive apparatus according to the invention, the housing has an air-inlet port, which is located above the optical disc held by the disc-holding unit. Through the air-inlet port, air is drawn from outside by virtue of an airflow that develops as the optical disc is rotated. The air then flows through the space that faces the space accommodating the optical pickup, across the optical disc. The air is then discharged from the housing, through the air-outlet ports that are located above the optical disc held by the disc-holding unit.

In this disc drive apparatus, the dust or the like contained in air is prevented from entering the space in the housing, which accommodates the optical pickup. Further, the dust or the like contained in air can be efficiently expelled from the housing, without being accumulated in the housing.

Hence, the dust or the like contained in air is prevented from fouling the interior of the housing in the disc drive apparatus. The interior of the housing can therefore be maintained clean for a long time, without sealing the housing airtight.

DETAILED DESCRIPTION OF THE PREFERRED EMBODIMENTS

A disc drive apparatus according to this invention will be described in detail, with reference to the accompanying drawings.

Figure 1:
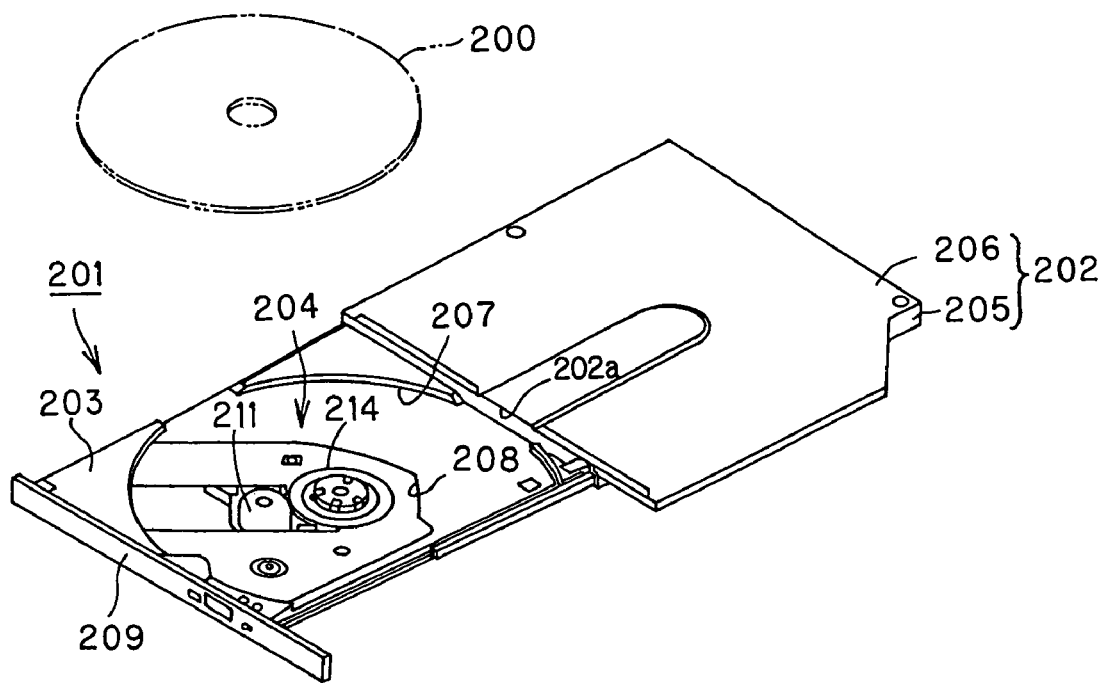
FIG. 1 is a perspective view showing the structure of a conventional disc drive apparatus.
Figure 2:
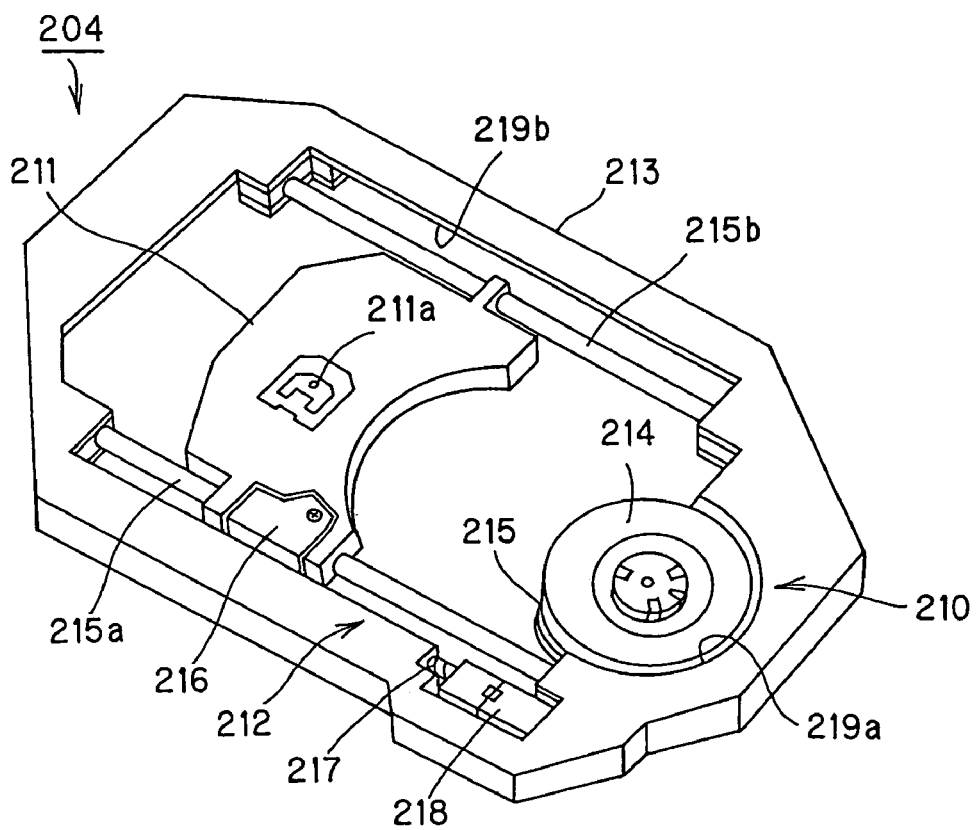
FIG. 2 is a perspective view depicting the base unit of the conventional disc drive apparatus.
Figure 3:
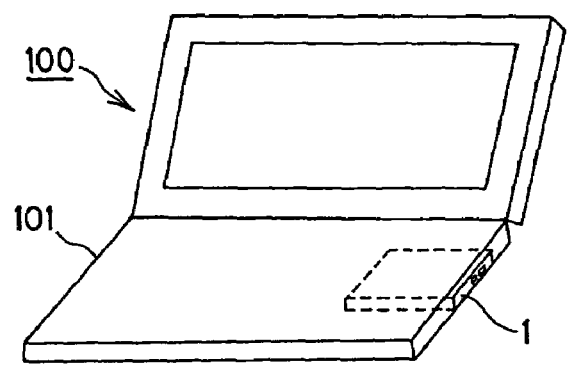
FIG. 3 is a perspective view of a notebook-type personal computer that incorporates a disc drive apparatus according to the present invention.
Figure 4:
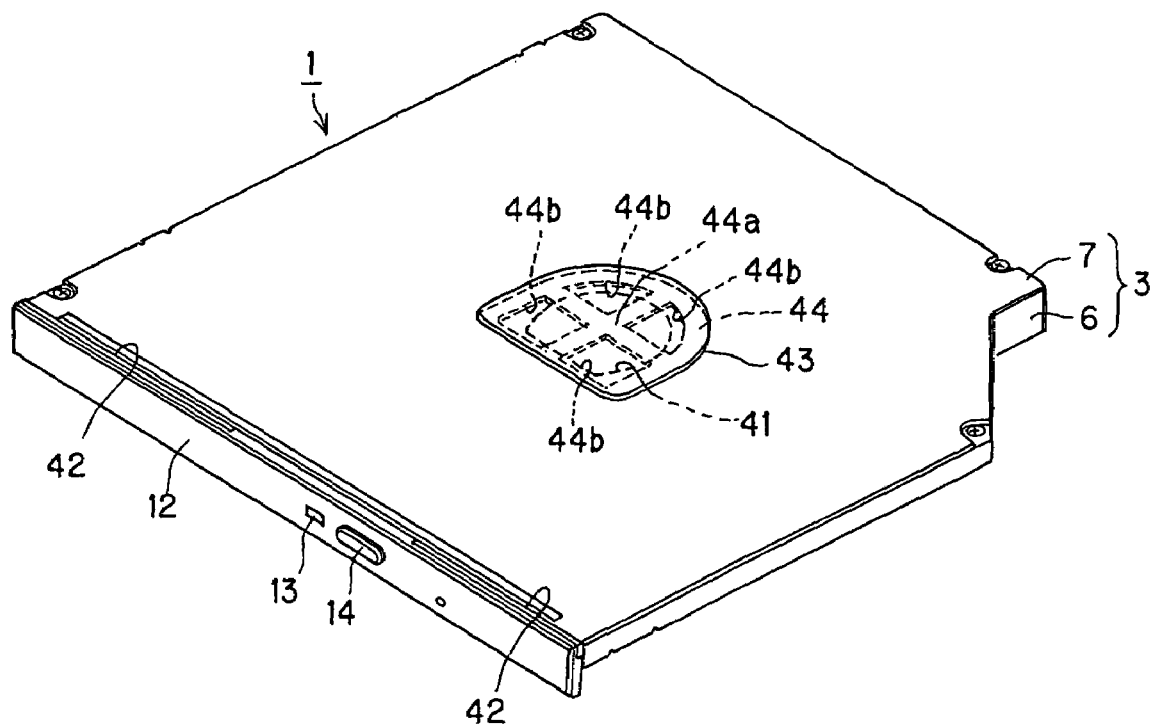
FIG. 4 is a perspective view of the disc drive apparatus, showing the disc tray pulled into the housing.

As FIGS. 3 and 4 show, the disc drive apparatus 1 according to this invention is a very thin disc drive unit to be incorporated in the housing 101 of, for example, a notebook-type personal computer 100. The disc drive apparatus 1 is as thin as about 9.5 mm, which is the thickness of a hard disc drive (HDD) unit. The apparatus 1 can record data signals in, and reproduce data signals from, an optical disc 2 such as a CD (Compact Disc) or a DVD (Digital Versatile Disc).

Figure 5:
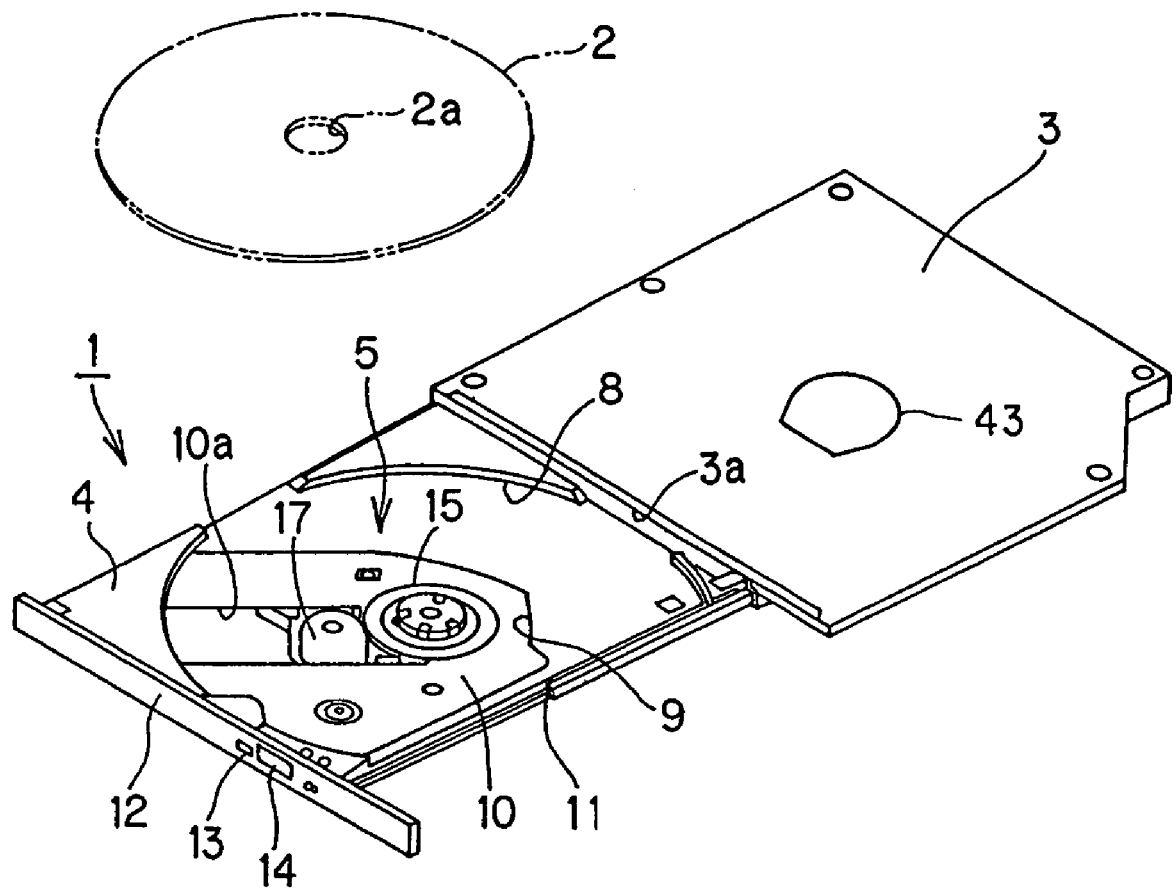
FIG. 5 is a perspective view of the disc drive apparatus, showing the disc tray pulled from the housing.
Figure 6:
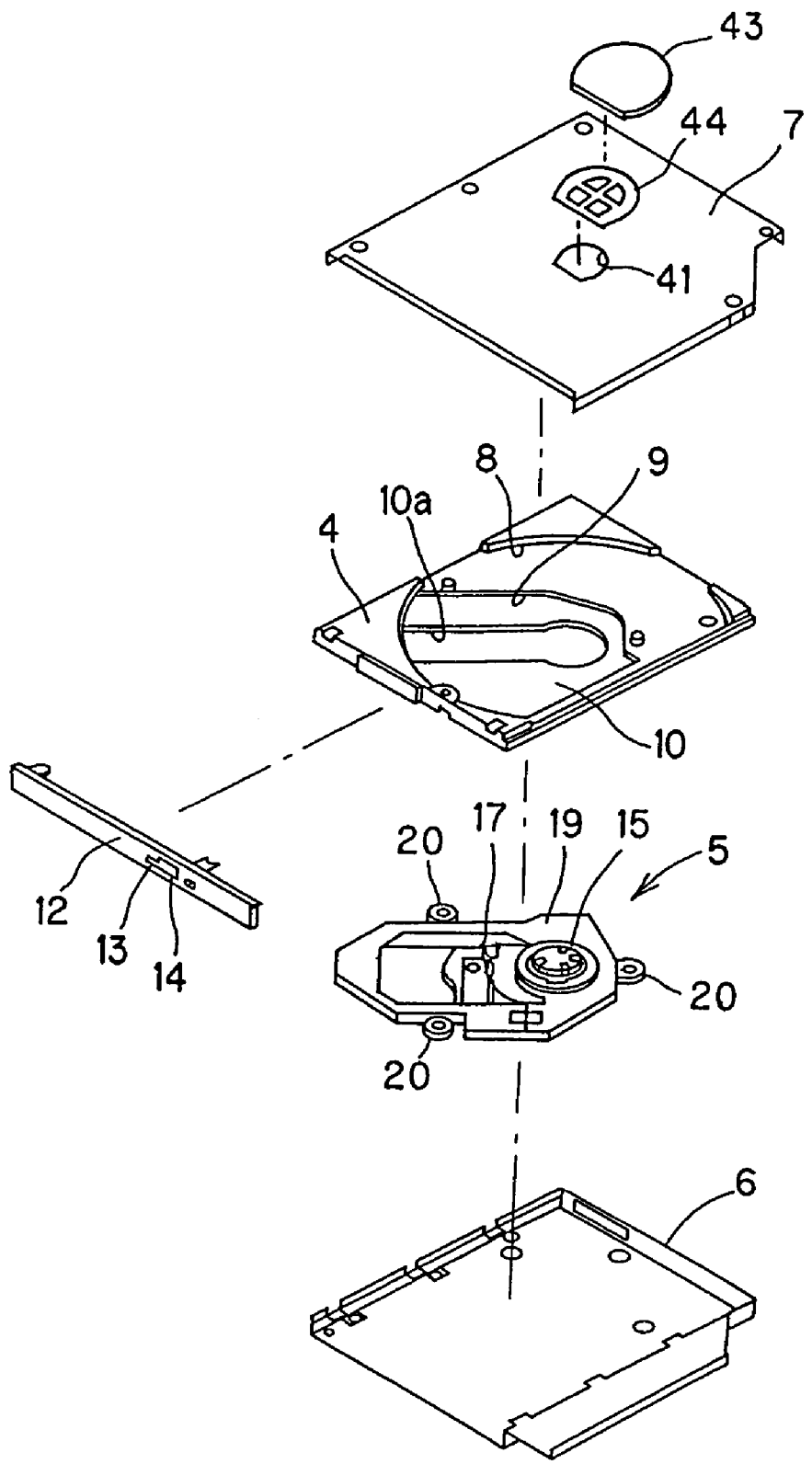
FIG. 6 is an exploded perspective view of the disc drive apparatus.

As FIGS. 5 and 4 depict, the disc drive apparatus 1 comprises a housing 3, a disc tray 4, and a base unit 5. The housing 3 has a tray port 3a made in the front. Through the tray port 3a, the disc tray 4 can be inserted into and pulled from the housing 3 in the horizontal direction. The base unit 5 is secured to the disc tray 4.

The housing 3 comprises a lower case 6 and a top plate 7. The lower case 6 is shaped like a flat box and opens at the top; it has been made by processing a metal plate. The top plate 7 is secured, with screws, to the lower case 6, closing the opening of the lower case 6. The lower case 6 has a bottom, which is substantially rectangular. On one side of the lower case 6 there is provided a deck part, which protrudes from the bottom of the lower case 6. The top plate 7 has a ceiling part and a pair of side walls. The ceiling part closes the opening of the lower case 6. The side walls have been formed by bending the edge portions of the ceiling part. The side walls extend along the sides of the lower case 6. The housing 3 composed of the lower case 6 and the top plate 7 defines a space, in which the disc tray 4 is provided. The front wall of the housing 3 has an opening, i.e., tray port 3a.

The disc tray 4 is shaped like a rectangular plate and made of synthetic resin. It has a recess 8 in the upper surface. The recess 8 has a shape that corresponds to that of the optical disc 2. An opening 9 is cut in the bottom of the recess 8. Through this opening 9, the upper surface of the base unit 5, which is secured to the lower surface of the disc tray 4, is exposed upwards. A decorative plate 10 is secured to the base unit 5 that is exposed upwards through the opening 9. The decorative plate 10 covers the opening 9. The decorative plate 10 has an opening 10a. The opening 10a corresponds to openings 22a and 22b, through which the turntable 15a of the base unit 5 and the objective lens 17a of an optical pickup 17 are exposed upwards. The turntable 15a and the objective lens 17a will be described later.

The disc tray 4 can slide between a pulled-in position and a pulled-out position, while being guided by guide rail mechanisms 11 that extend between the sides of the tray 4 and the inner sides of the lower case 6. At the pulled-in position, the disc tray 4 lies in the housing 3 after it is pulled in through the tray port 3a. At the pulled-out position, the disc tray 4 protrudes from the housing 3 after it is pulled out through the tray port 3a.

A front panel 12 is attached to the front of the disc tray 4. The panel 12 is shaped like a rectangular plate and can open and close the tray port 3a. A display unit 13 and an ejection button 14 are provided on the front of the front panel 12. The display unit 13 emits light, showing that the optical disc 2 is being accessed. The ejection button 14 is depressed so that the disc tray 4 may be ejected.

The housing 3 contains a lock mechanism (not shown). The lock mechanism holds the disc tray 4 held in the housing 3, inhibiting the tray 4 from sliding toward the front. When the ejection button 14 is depressed, the lock mechanism releases the disc tray 4. The disc tray 4 is therefore pushed out from the front through the tray port 3a. Thus, the disc tray 4 can be moved to the pulled-out position through the tray port 3a. When the disc tray 4 is pushed to the pulled-in position through the tray port 3a, the lock mechanism holds the disc tray 4 again, inhibiting the tray 4 from sliding toward the front.

Figure 7:
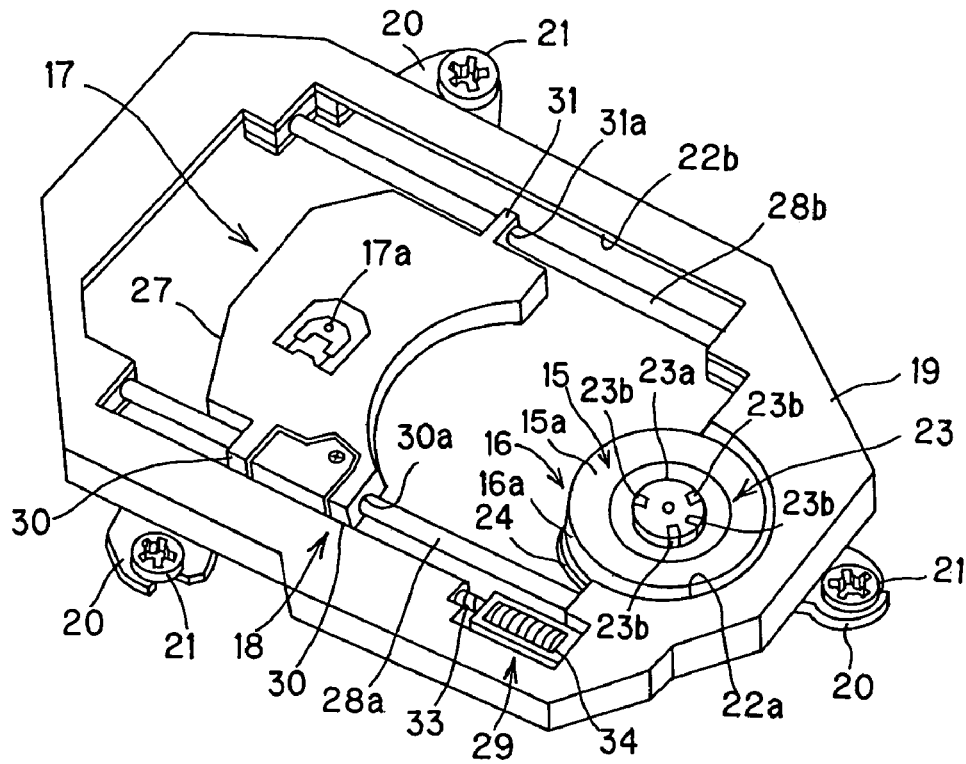
FIG. 7 is a perspective view of the base unit of the disc drive apparatus, as viewed from above.
Figure 8:
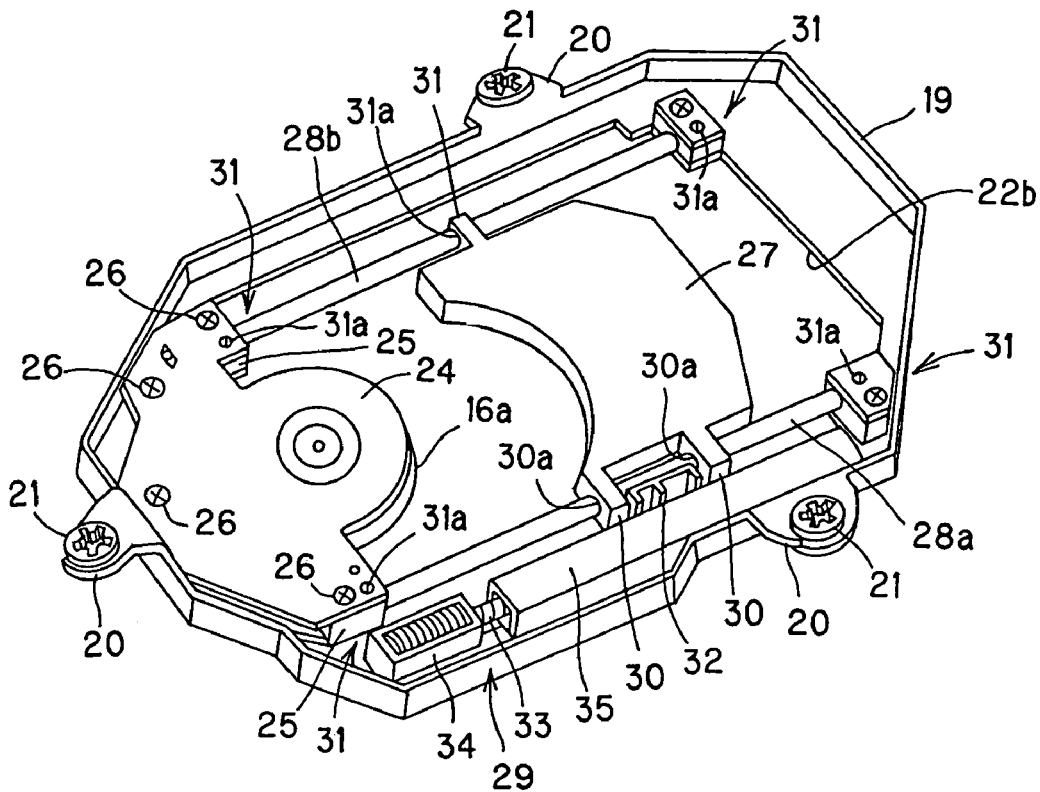
FIG. 8 is a perspective view of the base unit as viewed from below.

As FIGS. 7 and 8 show, the base unit 5 comprises a disc-holding part 15, a disc-driving mechanism 16, an optical pickup 17, a pickup-moving mechanism 18, and a base 19. The disc-holding part 15 holds the optical disc 2. The disc-driving mechanism 16 rotates the optical disc 2 held by the disc-holding part 15. The optical pickup 17 writes signals in, and reads signals from, the optical disc 2 rotated by the disc-driving mechanism 16. The pickup-moving mechanism 18 moves the optical pickup 17 in the radial direction of the optical disc 2. The disc-holding part 15, mechanism 16, optical pickup 17 and mechanism 18 are attached to the lower surface of the base 19. The base unit 5 is a very thin structure.

The base 19 has been formed by first cutting a metal plate, providing a plate of a specific shape and then bending the edges of the plate, downwards. The base 19 has three insulator-holding parts 20, which extend outwards from three of the edges bent downwards. Insulators 21 are secured to the insulator-holding parts 20, respectively. The insulators 21 are made of elastic material, such as rubber, which absorbs vibrations and the like. The base 19 is fixed to the lower surface of the disc tray 4, with these insulators 21 interposed between the disc tray 4 and the base 19. The base 19 has a semicircular opening 22a and a rectangular opening 22b, which are continuous to each other. Through the opening 22a, the turntable 15a is exposed upwards. Through the opening 22b, the objective lens 17a of the optical pickup 17 is exposed upwards.

The disc-holding part 15 has a turntable 15a, which is rotated by the disc-driving mechanism 16. A chucking mechanism 23 designed to hold the optical disc 2 is provided on the center part of the turntable 15a. The chucking mechanism 23 has an engagement projection 23a and a plurality of engagement claws 23b. The projection 23a can be inserted in the center hole 2a of the optical disc 2. The claws 23b that can contact the annular region of the optical disc 2, which lies around the center hole 2a. The chucking mechanism 23 holds the optical disc 2 on the turntable 15a, while performing the centering of the optical disc 2.

The disc-driving mechanism 16 has a spindle motor 16a. The spindle motor 16a is shaped like a flat disc. The turntable 15a is provided on the upper surface of the spindle motor 16a, integrally formed with the spindle motor 16a. The spindle motor 16a rotates the turntable 15a, which in turn rotates the optical disc 2. The spindle motor 16a is mounted on a circuit board 24. The circuit board 24 is secured to the lower surface of the base 19 by means of screws 26, with a spacer 25 interposed between it and the base 19. Thus, the turntable 15a protrudes a little upward from the upper surface of the base 22 through the opening 22a of the base 19.

The optical pickup 17 has a semiconductor laser, an objective lens 17a, and a light-receiving element. The semiconductor laser, which is used as light source, emits a light beam. The object lens 17a focuses the light beam, applying the beam to the signal-recorded surface of the optical disc 2, thus writing signals in the optical disc 2. The light-receiving element detects the light beam reflected from the signal-recorded surface of the optical disc 2, thus reading signals from the optical disc 2.

The optical pickup 17 further has a biaxial actuator (not shown). The biaxial actuator drives the objective lens 17a in the axial direction (focusing direction) of the objective lens 17a and the direction (tracking direction) that intersects at right angles to the axial direction of the objective lens 17a. In the optical pickup 17, the biaxial actuator performs drive controls, such as focusing-servo control and tracking-servo control, in accordance with a detection signal that the light-emitting element has detected from the optical disc 2. In the focusing-servo control, the actuator moves the objective lens 17a in the focusing direction to bring the focal point of the lens 17a to the signal-recorded surface of the optical disc 2. In the tracking-servo control, the actuator moves the objective lens 17a in the tracking direction to move the beam spot to the recorded track.

The pickup-moving mechanism 18 has a pickup base 27, two guide rods 28a and 28b, and a base-driving mechanism 29. The components of the optical pickup 17 are mounted on the pickup base 27. The guide rods 28a and 28b support the pickup base 27, enabling the pickup base 27 to move in the radial direction of the optical disc 2. The base-driving mechanism 29 is designed to move the pickup base 27 supported by the guide rods 28a and 28b, in the radial direction of the optical disc 2.

The pickup base 27 has a pair of guide strips 30 and a guide strip 31. The guide strips 30 protrude from one side of the pickup base 27, and the guide strip 31 protrudes from the opposite side of the pickup base 27. The guide strips 30 have a guide hole 30a, through which one guide rod 28a extends. The guide strip 31 has a guide groove 31a, in which the other guide rod 28b rests. Thus, the pickup base 27 is supported by the guide rods 28a and 28b and can slide.

The guide rods 28a and 28b extends below the lower surface of the base 19, in parallel to the radial direction of the optical disc 2. They guide the pickup base 27 exposed through the opening 22b of the base 19, from the inner circumference of the optical disc 2 to the outer circumference thereof, or and vice versa. The guide rods 28a and 28b are fastened, at both ends, to the lower surface of the 19 by means of a skew adjustment mechanism 31.

The skew adjustment mechanism 31 supports the guide rods 28a and 28b so that both ends of either guide rod may be moved at right angles to the major surface of the base 19. The skew adjustment mechanism 31 has adjustment screws 31a, which can be turned to adjust the positions of the ends of the guide rods 28a and 28b. Hence, the inclination of the guide rods 28a and 28b can be adjusted so that the light beam focused by the objective lens 17a of the optical pickup 17 may be applied perpendicular to the signal-recorded surface of the optical disc 2.

Figure 9:
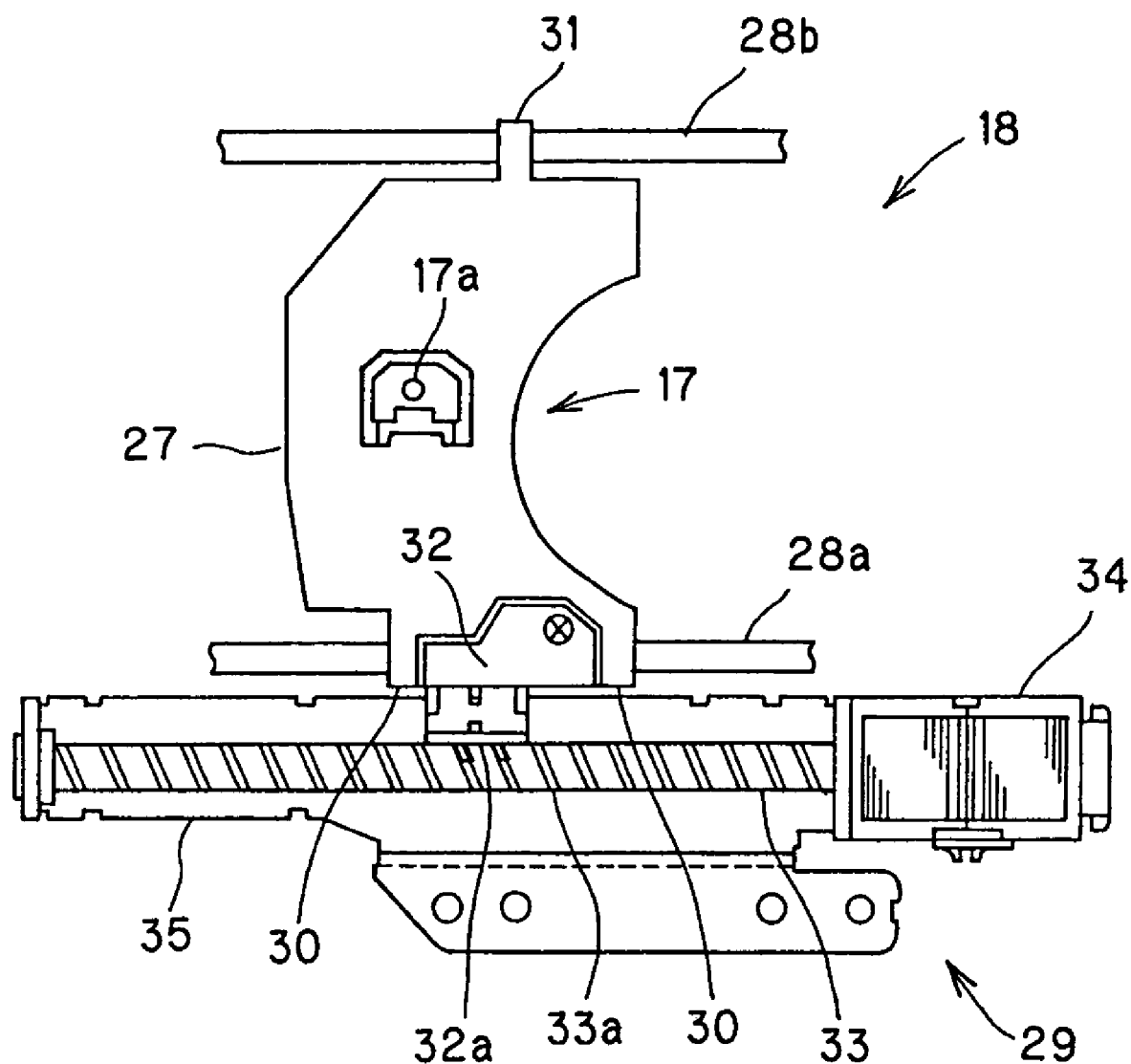
FIG. 9 is a plan view of the pickup-moving mechanism provided in the disc drive apparatus.

As FIG. 9 shows, the base-driving mechanism 29 has a lack member 32, a feed screw 33, and a drive motor 34. The lack member 32 is secured to the pickup base 27. The feed screw 33 is in mesh with the lack member 32. The drive motor 34 rotates the feed screw 33.

The lack member 32 has a lack portion 32a that is integrally formed. The proximal end of the lack portion 32a is located between the guide strips 30 of the pickup base 27 and secured to the pickup base 27 with a screw. The distal end of the lack portion 32a is in mesh with the feed screw 33 that extends parallel to the guide rod 28a. The feed screw 33 is integrally formed with the drive shaft of the drive motor 34. The feed screw 33 has a lead screw 33a, i.e., a helical groove, cut in its outer circumferential surface. Thus, the lack portion 32a of the lack member 32 is in mesh with the lead screw 33a. The drive motor 34 is a so-called stepping motor. It rotates the feed screw 33 as drive pulses drive it. The feed screw 33 and the drive motor 34 are supported by a bracket 35 that is secured with screws to the lower surface of the base 19. The bracket 35 has been made by bending both end parts of an elongated metal plate, at right angles in the same direction. The drive motor 34 is secured to one end part of the bracket 35, with the feed screw 33 passing through this end part of the bracket 35. The distal end of the feed screw 33 is held in the hole made in the other part of the bracket 35. Thus, the bracket 35 supports the feed screw 33, allowing the same to rotate.

The base-driving mechanism 29 moves the pickup base 27 supported by the guide rods 28a and 28b, in the radial direction of the optical disc 2, as the drive motor 34 rotates the feed screw 33. That is, as the feed screw 33 is rotated, the lack member 32 moves in the axial direction of the feed screw 33 because its lack portion 32a is in mesh with the lead screw 33a.

The personal computer 100 gives a recording command or a reproduction command to the disc drive apparatus 1 described above while the disc tray 4 holding the optical disc 2 remains in the housing 3. In this case, the apparatus 1 records data signals in, or reproduces data signals from, the optical disc 2, in accordance with the command. More precisely, the disc-driving mechanism 16 rotates the optical disc 2, the pickup-moving mechanism 18 moves the optical pickup 17 in the radial direction of the optical disc 2, and the optical pickup 17 writes the data signals in, or reads the data signals from, the optical disc 2.

Figure 10:
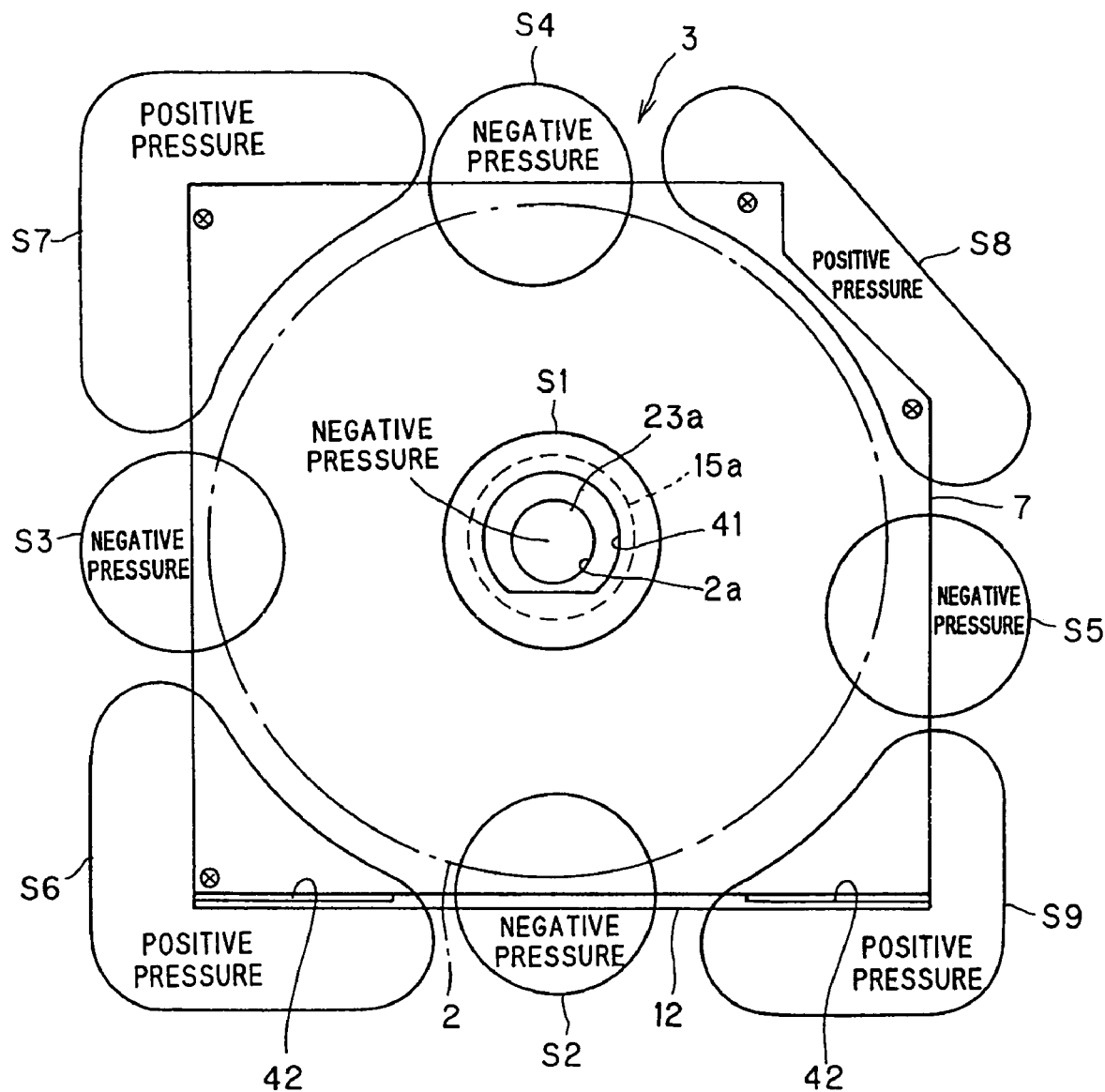
FIG. 10 is a plan view that schematically shows the positions where pressures are generated in the housing of the disc drive apparatus.

In the disc drive apparatus 1 described above, an airflow develops as the optical disc 2 is rotated. Due to the airflow, the pressure in the housing 3 is lower than the outside pressure at some positions, and higher than the outside pressure at other positions. As FIG. 10 schematically shows, the airflow that develops as the optical disc 2 is rotated generates a negative pressure at position S1, i.e., the center of the optical disc 2, and at positions S2, S3, S4 and S5, i.e., the middle parts of the sides of the housing 3. The airflow generates a positive pressure at position S6, S7, S8 and S9, i.e., the corners of the housing 3.

Thus, in the disc drive apparatus 1 according to this invention, the housing 3 has an air-inlet port 41 in the part where a negative pressure is generated, and air-outlet ports 42 in the parts where a positive pressure is generated. Air can therefore smoothly flow from the air-inlet port 41 to the air-outlet ports 42. Hence, the interior of the housing 3 can remain clean, without sealing the housing 3 airtight.

Moreover, the air-inlet port 41 and air-outlet ports 42 are located above the optical disc 2 mounted on the turntable 15a in this disc drive apparatus 1. This prevents air from flowing from outside into the space of the housing 3 in which the optical pickup 17 is arranged. In other words, the air-inlet port 41 and air-outlet ports 42 made in the housing 3 open to a space that faces the space accommodating the optical pickup 17, across the optical disc 2 mounted on the turntable 15a.

Air is therefore prevented from flowing to the optical pickup 17 in the disc drive apparatus 1. The dust or the like contained in the air flowing from outside would not foul the optical pickup 17 or the like.

Figure 11:
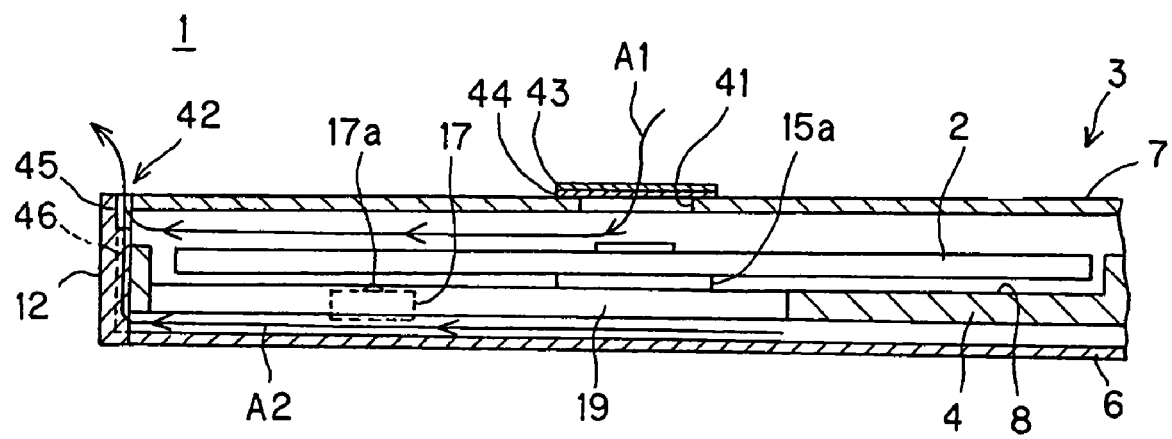
FIG. 11 is a sectional view that schematically illustrates how air flows in the housing of the disc drive apparatus.

To be more specific, the housing 3 has an air-inlet port 41 and air-outlet ports 42 as is illustrated in FIGS. 4, 10 and 11. The port 41 for drawing air from outside is made in the top plate 7 and located at position S1 that is close to the center of the optical disc 2 mounted on the turntable 15a. The air-outlet ports 42 for discharging air from the housing 3 are made in the corners defined by the top plate 7 and the front panel 12 and located at positions S6 and S9.

The air-inlet port 41 is an almost circular hole made in the top plate 7, substantially at the center thereof, which faces the turntable 15a. A dust filter 43 is provided at the center part of the top plate 7, covering the air-inlet port 41.

The dust filter 43 is designed to collect the dust contained in the air drawn from outside through the air-inlet port 41. The dust filter 43 is made of unwoven cloth, paper or the like. The dust filter 43 is reinforced with a reinforcing member 44, not to be deformed when it receives a suction force applied from the air-inlet port 41.

The reinforcing member 44 is made of plastic film or the like. It is bonded to the upper surface of the top plate 7 and covers the air-inlet port 41. The reinforcing member 44 has a cross-shaped support strip 44a that extends over the air-inlet port 41. The strip 44a divides the port 41 into four openings 44b. The dust filter 43 is bonded to the top of the reinforcing member 44.

Therefore, the support strip 44a of the reinforcing member 44 supports the dust filter 43 over the air-inlet port 41. The dust filter 43 is thus reinforced and will not be deformed in spite of the suction force applied from the air-inlet port 41. The shape of the reinforcing member 44 is not limited to such a shape. Rather, it may have any other shape so long as it supports the dust filter 43 and does not completely close the air-inlet port 41.

Figure 12:
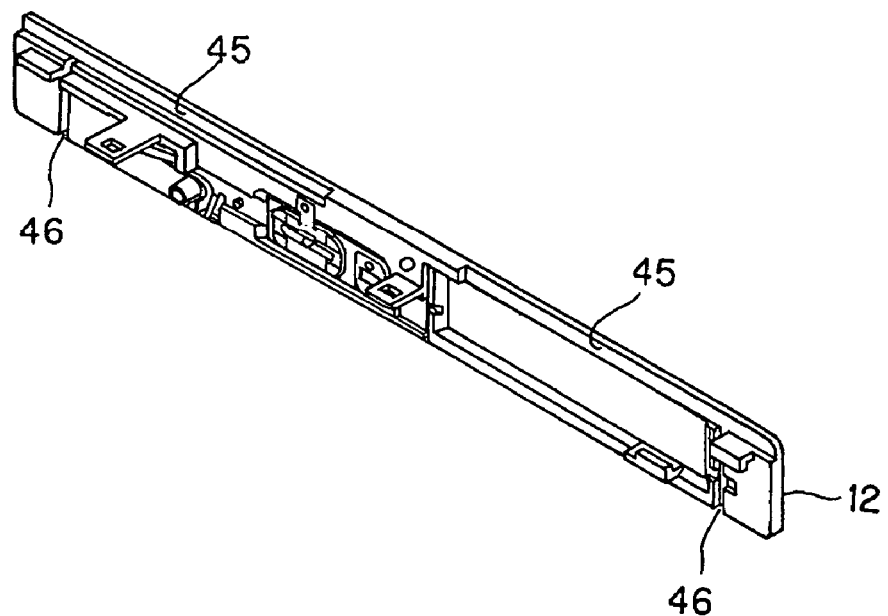
FIG. 12 is a perspective view of the front panel of the disc drive apparatus, as viewed from the back.
Figure 13:
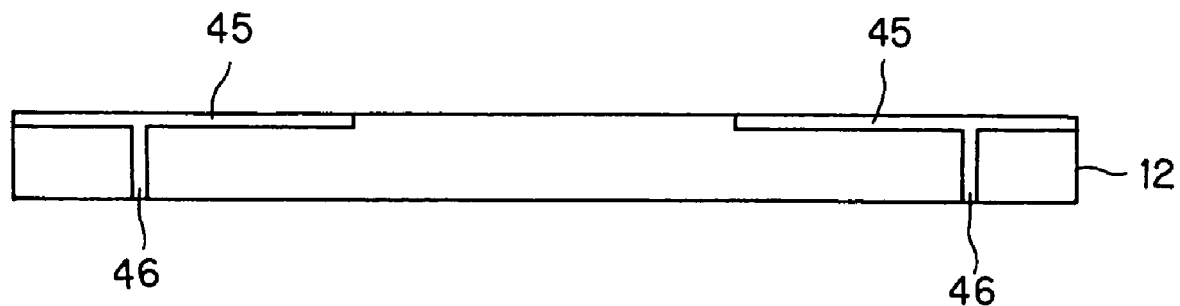
FIG. 13 is a rear view schematically showing the front panel.

The air-outlet ports 42 are gaps provided between the top plate 7 and the front panel 12. As FIGS. 11, 12 and 13 depict, the front panel 12 has first grooves 45 cut in the back, which define air-outlet ports 42. The first grooves 45 have been made by cutting that edge of the panel 12 proximal to the top plate 7, from the upper corners of the panel 12 toward the middle part thereof in the horizontal direction.

Second grooves 46 are cut in the back of the front panel 12. The second grooves 46 make the first grooves 45 communicate with the spaces which lie near the corner positions S6 and S9 and which face the space accommodating the optical pickup 17, across the optical disc 2 mounted on the turntable 15a. The second grooves 46 are located at the ends of the front panel 12 and spaced apart by the middle part of the front panel 12. They have been made by cutting the back of the panel 12 in the vertical direction.

In the disc drive apparatus 1 thus configured, air A1 flows from outside into the housing 3 through the air-inlet port 41 as shown in FIG. 11, by virtue of the airflow generated as the optical disc 2 is rotated. In the housing 3, air A1 first flows through the space that faces the space accommodating the optical pickup 17, across the optical disc 2. Air A1 is then discharged outside the housing 3, through the air-outlet ports 42.

In the disc drive apparatus 1, air A2 in the space that accommodates the optical pickup 17 is discharged outside the housing 3 through the air-outlet ports 42 after flowing first through the second grooves 46 and then through the first grooves 45.

In the disc drive apparatus 1, the dust or the like contained in air A1 is therefore prevented from entering the space accommodating the optical pickup 17. The dust or the like contained in air A1 can be efficiently expelled from the housing 3 as air flows over the optical disc 2, without being accumulated in the housing 3.

Hence, the dust or the like contained in air A1 is prevented from fouling the optical pickup 17 in the disc drive apparatus 1. The interior of the housing 3 can therefore be maintained clean for a long time, without sealing the housing 3 airtight.

In the disc drive apparatus 1, the dust filter 43 prevents the dust or the like contained in the air flowing from outside, from entering the housing 3 through the air-inlet port 41. Air A1 made clean by the dust filter 43 is supplied into the housing 3 through the air-inlet port 41. This helps to maintain the interior of the housing 3 more clean.

Figure 14:
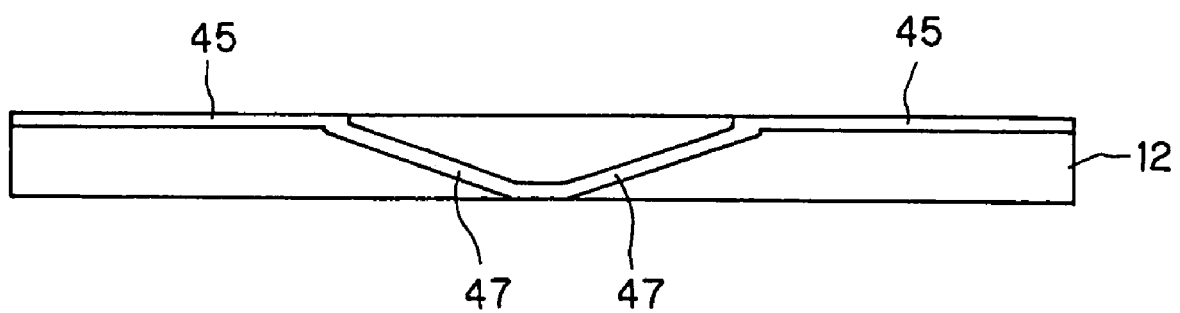
FIG. 14 is a rear view schematically showing another type of a front panel.

In the disc drive apparatus 1 described above, the second grooves 46 are cut in the back of the front panel 12 as is illustrated in FIG. 13. Nonetheless, the grooves 46 may be replaced by second grooves 47 that are cut in the back of the front panel 12, but at different parts as shown in FIG. 14.

More precisely, the second grooves 47 are made in the middle part of the front panel 12, each extending slantwise from the lower edge of the panel 12 toward the inner end of one first groove 45.

Thus, two second grooves 47 connect the first grooves 45 to the space accommodating the optical pickup 17, which lies at position S1 close to the center of the optical disc 2 mounted on the turntable 15a. Therefore, in the disc drive apparatus 1, air A2 is forced out from the space accommodating the optical pickup 17, first through the second grooves 47 and then through the fist grooves 45. Subsequently, air A2 is discharged outside the housing 3 through the air-outlet ports 42. This prevents the dust or the like contained in air A1 from entering the space in which the optical pickup 17 is arranged.

The structure of the disc drive apparatus 1 according to this invention is not limited to the one described above. The apparatus 1 may have, for example, the structure illustrated in FIG. 15.

Figure 15:
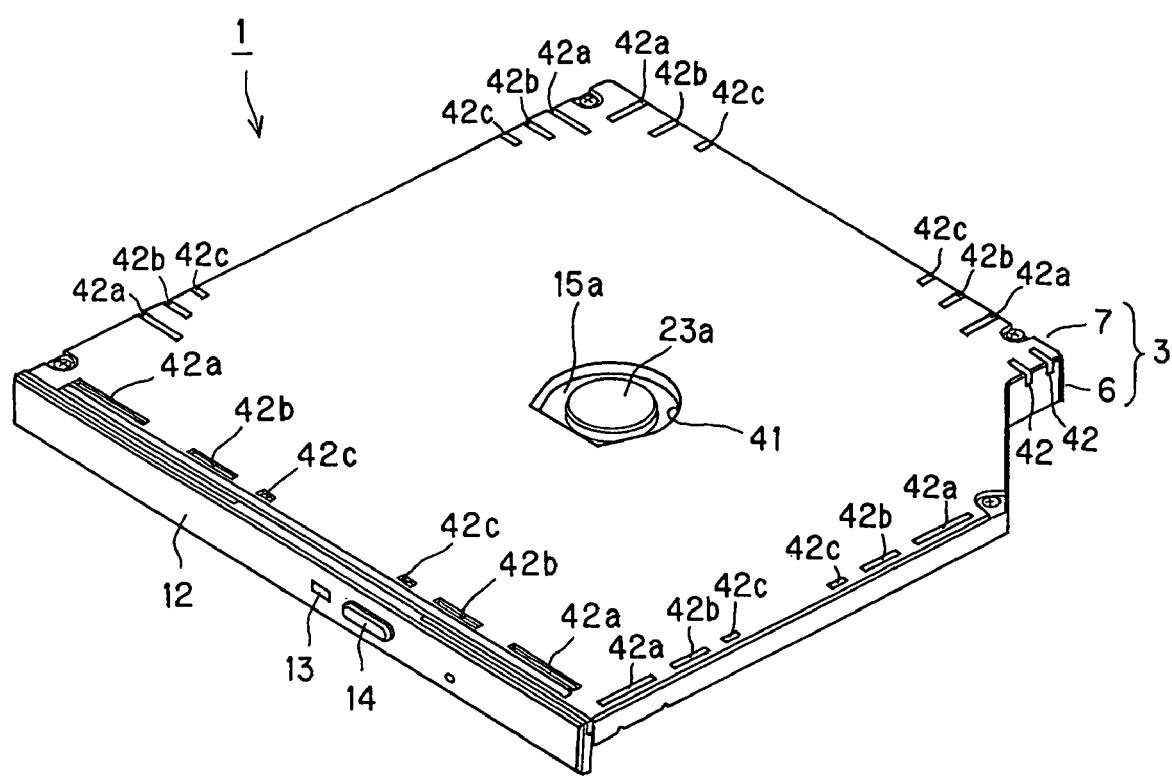
FIG. 15 is a perspective view of another disc drive apparatus according to the invention.

In the disc drive apparatus 1 shown in FIG. 15, the top plate 7 has a plurality of air-outlet ports 42a, 42b and 42c, which are cut in the edge portion connected to the front panel 12. The ports 42a, 42b and 42c are arranged from the corners of the top plate 7 toward the middle part of the edge portion of the top panel 7.

The air-outlet ports 42a, 42b and 42c are elongated slits that horizontally extend in parallel to the direction in which they are arranged. The air-outlet ports 42a, 42b and 42c have different opening areas, because the negative pressure gradually falls from the corner toward the middle part of the front panel 12. That is, each air-outlet port is shorter than the next air-outlet port that lies farther from the middle part of the panel 12.

In the apparatus 1 shown in FIG. 15, air A1 enters the housing 3 from outside through the air-inlet port 41 when an airflow develops as the optical disc 2 is rotated. In the housing 3, air A1 flows through the space facing the space accommodating the optical pickup 17, across the optical disc 2. Air A1 is then discharged from the housing 3 through the plurality of air-outlet ports 42a, 42b and 42c.

In this disc drive apparatus 1, the dust or the like contained in air A1 is prevented from entering the space in the housing 3, which accommodates the optical pickup 17. Further, the dust or the like contained in air A1 can be efficiently expelled from the housing 3 as air flows over the optical disc 2, without being accumulated in the housing 3.

In the disc drive apparatus 1 described above, the top plate 7 or the lower case 6 may have air-outlet ports 42 in its corners, namely at positions S6, S7, S8 and S9, for the purpose of allowing air to flow smoothly from the air-inlet port 41 to the air-outlet ports 42. Alternatively, for the same purpose, gaps serving as air-outlet ports 42 may be provided between the corners of the top plate 7 and the corners of the lower case 6, namely at positions S6, S7, S8 and S9.

In the disc drive apparatus 1 shown in FIG. 15, the top plate 7 has a plurality of air-outlet ports 42a, 42b and 42c cut in the rear edge of the top plate 7, in addition to the air-outlet ports 42a, 42b and 42c that are cut in the edge portion connected to the front panel 12. The additional air-outlet ports 42a, 42b and 42c are arranged from the corners of the top plate 7 toward the middle part of the rear edge portion of the top panel 7. The additional air-outlet ports 42a, 42b and 42c are elongate slits that extend at right angles to the direction in which they are arranged. The air-outlet ports 42a, 42b and 42c have different opening areas, because the negative pressure gradually falls from the corner toward the middle part of the front panel 12. That is, each air-outlet port is shorter than the next air-outlet port that lies farther from the middle part of the panel 12.

In this disc drive apparatus 1, the top plate 7 further has air-outlet ports 42a, 42b and 42c cut in either side edge portion of the top plate 7. The air-outlet ports 42a, 42b and 42c are arranged from the corners of the top plate 7 toward the middle part of the side edge portion of the top panel 7. They are elongated slits that extend either horizontally or vertically.

Furthermore, in this disc drive apparatus 1, the lower case 6 may have air-outlet ports 42 that are cut in its side walls and are continuous to the elongated air-outlet ports 42 cut in the top plate 7.

The air-outlet ports 42 are so arranged and their openings are so adjusted as specified above in the disc drive apparatus 1. Hence, air can appropriately flow in the housing 3, from the air-inlet port 41 to the air-outlet ports 42.

To control the airflow in the housing 3 of the disc drive apparatus 1, air-inlet ports 41 may be provided at positions where a negative pressure is generated. That is, air-inlet ports 41 may be provided at positions S2, S3, S4 and S5, i.e., the middle parts of the edge portions of the top plate 7, or at positions, i.e., the middle parts of the sides of the housing 3. Alternatively, gaps serving as air-inlet ports 41 may be provided at positions S2, S3, S4 and S5, between the top plate 7 and the front panel 12.

The present invention is not limited to the tray-type disc drive apparatuses 1 described above. The invention can be applied to slot-in type disc drive apparatuses that have a housing with a slot through which an optical disc can be inserted into, and pulled out from, the housing.

What is claimed is:

1. A disc drive apparatus, comprising:
   a housing including a top plate;
   a disc-holding unit configured to hold an optical disc in the housing;
   a disc-driving mechanism configured to rotate the optical disc held by the disc-holding unit;
   an optical pickup configured to write signals in, and read signals from, the optical disc being rotated by the disc-driving mechanism; and
   a pickup-moving mechanism configured to move the optical pickup in a radial direction of the optical disc,
   wherein, when the optical disc is in the housing, the housing has an air-inlet portion which is located above the optical disc held by the disc-holding unit and through which air is drawn from outside by virtue of an airflow that develops as the optical disc is rotated, and air-outlet portions that are separate from the air-inlet portion and through which air is discharged from the housing, and
   wherein the air-outlet portions are provided near corners of the top plate.

2. The disc drive apparatus according to claim 1, wherein the air-inlet portion and/or the air-outlet portions are made in the top plate of the housing, which faces the disc-holding unit.

3. The disc drive apparatus according to claim 2, wherein the air-inlet portion is made in the top plate and faces the disc-holding unit.

4. The disc drive apparatus according to claim 2, wherein the air-inlet portion is made in a middle part of an edge portion of the top plate.

5. The disc drive apparatus according to claim 1, further comprising a dust filter that covers the air-inlet portion.

6. The disc drive apparatus according to claim 5, further comprising a reinforcing member that reinforces the dust filter.

7. The disc drive apparatus according to claim 1, wherein the air-outlet portions are arranged from corners of an edge portion of the top plate toward a middle part of the edge portion and have different opening areas such that each air-outlet portion has a smaller opening area than the next air-outlet portion located farther from the middle part of the edge portion.

8. The disc drive apparatus according to claim 1, wherein the housing has a lower case shaped like a flat box and opening at the front and top, the top plate closing the open top of the lower case, and a front panel closing the open front of the lower case, and the air-inlet portion and/or the air-outlet portions are gaps provided between the top plate and the front panel.

9. The disc drive apparatus according to claim 8, wherein the air-inlet portion is a gap provided near a middle part located between the top plate and the front panel.

10. The disc drive apparatus according to claim 8, wherein the air-outlet portions are gaps provided near corners located between the top plate and the front panel.

11. The disc drive apparatus according to claim 8, wherein a first grooves are made in a back of the front panel, providing the gaps.

12. The disc drive apparatus according to claim 11, wherein second grooves are made in the back of the front panel and connect a space accommodating the optical pickup to the first grooves that are the air-outlet portions opposed to the space across the optical disc held by the disc-holding unit.

13. The disc drive apparatus according to claim 12, wherein the second grooves connect a corner accommodating the optical pickup and opposed to the optical disc held by the disc-holding unit, to the first grooves providing gaps that are the air-outlet portions near the corners between the top plate and the front panel.

14. The disc drive apparatus according to claim 12, wherein the second grooves connect a middle part accommodating the optical pickup and opposed to the optical disc held by the disc-holding unit, to the first grooves providing gaps that are the air-outlet portions near the corners between the top plate and the front panel.

15. The disc drive according to claim 1,
wherein the housing has a lower case shaped like a flat box and opening at the front and top, the top plate closing the open top of the lower case, and a front panel closing the open front of the lower case, and the air-inlet portion and/or the air-outlet portions are made in side walls of the lower case.

16. The disc drive apparatus according to claim 15, wherein the air-inlet portion is provided in a center part of one of the side walls.

17. The disc drive apparatus according to claim 15, wherein the air-inlet portion is provided in a corner of one of the side walls.

18. The disc drive apparatus according to claim 1, wherein, when the optical disc is rotated, air in a portion of the disc drive apparatus accommodating the optical pickup unit is discharged through the air-outlet portions.

* * * * *